(12) United States Patent
Hung

(10) Patent No.: US 9,991,729 B2
(45) Date of Patent: Jun. 5, 2018

(54) ELECTRONIC DEVICE HAVING A CHARGING VOLTAGE REGULATION CIRCUIT

(71) Applicant: Quanta Computer Inc., Taoyuan (TW)

(72) Inventor: Li-Te Hung, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 59 days.

(21) Appl. No.: 15/224,743

(22) Filed: Aug. 1, 2016

(65) Prior Publication Data

US 2017/0346304 A1 Nov. 30, 2017

(30) Foreign Application Priority Data

May 31, 2016 (TW) ................ 105116997 A

(51) Int. Cl.
*H02J 7/00* (2006.01)
*H02J 1/12* (2006.01)
(Continued)

(52) U.S. Cl.
CPC ............ *H02J 7/007* (2013.01); *H02J 7/0068* (2013.01); *H02J 2007/0001* (2013.01)

(58) Field of Classification Search
CPC .. H02J 7/007; H02J 7/0068; H02J 2007/0001; H02J 7/0004; H02J 7/0006;
(Continued)

(56) References Cited

U.S. PATENT DOCUMENTS 6,380,763 B1 * 4/2002 Ando ................ H02J 7/0031
326/68
9,077,199 B2 7/2015 Liu
(Continued)

FOREIGN PATENT DOCUMENTS

TW   M472358 U    2/2014
TW   201417447 A   5/2014

OTHER PUBLICATIONS

Chinese language office action dated Feb. 24, 2017, issued in application No. TW 105116997.

*Primary Examiner* — Yalkew Fantu
*Assistant Examiner* — Mohammed J Sharief
(74) *Attorney, Agent, or Firm* — McClure, Qualey & Rodack, LLP

(57) ABSTRACT

An electronic device includes a battery module, a first switch circuit, a connector, a voltage stabilizer and a controller circuit. The controller circuit is coupled to the connector and the first switch circuit. A configuration channel is implemented between the controller circuit and the connector. When a voltage of the battery module is lower than a threshold voltage and is only connected to a first power source, the first power source provides an activating voltage to the controller circuit through the voltage stabilizer, so as to enable the controller circuit. The connector sends a first detection signal to the controller circuit through the configuration channel. The controller circuit sends a first control signal to turn on the first switch circuit according to the first detection signal, so that the first power source charges the battery module through the first switch circuit.

6 Claims, 4 Drawing Sheets

(51) Int. Cl.
*H02J 1/00* (2006.01)
*H02J 3/38* (2006.01)

(58) Field of Classification Search
CPC ...... H02J 3/34; H02J 9/062; H02J 3/38; H02J 3/46; H02J 7/0042; H02J 7/0045; H02J 3/32; H02J 7/34; H02J 9/061; H02J 3/383; Y02E 60/12; Y02E 10/563; H01M 10/48; H01M 10/4257; H01M 10/44; H01M 10/46; H01F 29/02; B60R 16/03; B60T 1/00; B60T 17/22; Y02T 10/7005
USPC ................. 320/106, 107; 307/21, 45, 46, 80
See application file for complete search history.

(56) References Cited

U.S. PATENT DOCUMENTS

| | | | | |
|---|---|---|---|---|
| 2005/0048359 | A1* | 3/2005 | Yamada | H01M 10/46 429/90 |
| 2005/0206388 | A1* | 9/2005 | Quint | H01M 10/42 324/430 |
| 2008/0303352 | A1* | 12/2008 | Hsieh | H02J 7/0068 307/113 |
| 2011/0043162 | A1* | 2/2011 | Lee | H02J 7/0077 320/107 |
| 2011/0057605 | A1* | 3/2011 | Chung | H02J 7/0004 320/107 |
| 2014/0021906 | A1* | 1/2014 | Whiting | H01M 10/44 320/107 |

* cited by examiner

ELECTRONIC DEVICE HAVING A CHARGING VOLTAGE REGULATION CIRCUIT

CROSS REFERENCE TO RELATED APPLICATIONS

This application claims priority of Taiwan Patent Application No. 105116997, filed on May 31, 2016, the entirety of which is incorporated by reference herein.

BACKGROUND OF THE INVENTION

Field of the Invention

The present invention relates to an electronic device, and in particular to an electronic device including an integrated controller circuit.

Description of the Related Art

In modern society, computer-related electronic devices have been essential electronic products in the living of life. Smartphones, tablet computers, desktop computers, or notebook computers are very popular products. Most electronic devices are equipped with a power jack and at least one universal serial bus (USB) connector, or they are equipped with only one universal serial bus connector which provides the functions of charging and data transmission.

However, electronic devices that are widely used at present need good power management to achieve the expected usage time, which the user needs, via a battery module in the electronic device. Therefore, the development of an electronic device having good power management by use of a universal serial bus connector is an important and valuable subject.

BRIEF SUMMARY OF THE INVENTION

A detailed description is given in the following embodiments with reference to the accompanying drawings.

The invention provides an electronic device including a battery module, a first switch circuit, a connector, a voltage stabilizer and a controller circuit. The first switch circuit is coupled to the battery module, and the connector is coupled to the first switch circuit. The voltage stabilizer is coupled to the connector. The controller circuit is coupled to the voltage stabilizer, the connector and the first switch circuit and the battery module. A configuration channel is implemented between the controller circuit and the connector. When the voltage of the battery module is lower than a threshold voltage and the connector is only connected to a first power source, the first power source provides an activating voltage to the controller circuit through the voltage stabilizer, so as to enable the controller circuit. The connector sends a first detection signal to the controller circuit through the configuration channel. The controller circuit sends a first control signal to turn on the first switch circuit according to the first detection signal, so that the first power source charges the battery module through the first switch circuit.

The present invention provides an electronic device, which includes a controller circuit and a connector. The connector can be a universal serial bus TYPE C connector, so as to allow the user to plug an external cable in to the connector without alignment. A configuration channel is implemented between the controller circuit and the connector. The controller circuit can receive a detection signal through the configuration channel CC, so as to determine a type of a device to which the connector connects. When the connector is connected to an external power, the controller circuit can turn on the first switch circuit, so that the external power charges the battery module. In addition, when the electronic device performs a high-load application, the user can connect a first power source to the connector and can connect a second power source to a power jack at the same time, so that the first power source and the second power source provide the electronic device with electricity at the same time for satisfying the power requirements of the electronic device. Furthermore, the controller circuit is an integrated chip, and includes the embedded controller and the connector controller. The embedded controller can control a driving current of the connector controller according to a system state of the electronic device, so as to save power.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed description of well-known functions and structures are omitted to avoid obscuring the subject matter of the invention.

It should be noted that different references to "an" or "one" embodiment in this disclosure are not necessarily to the same embodiment, and such references mean at least one. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
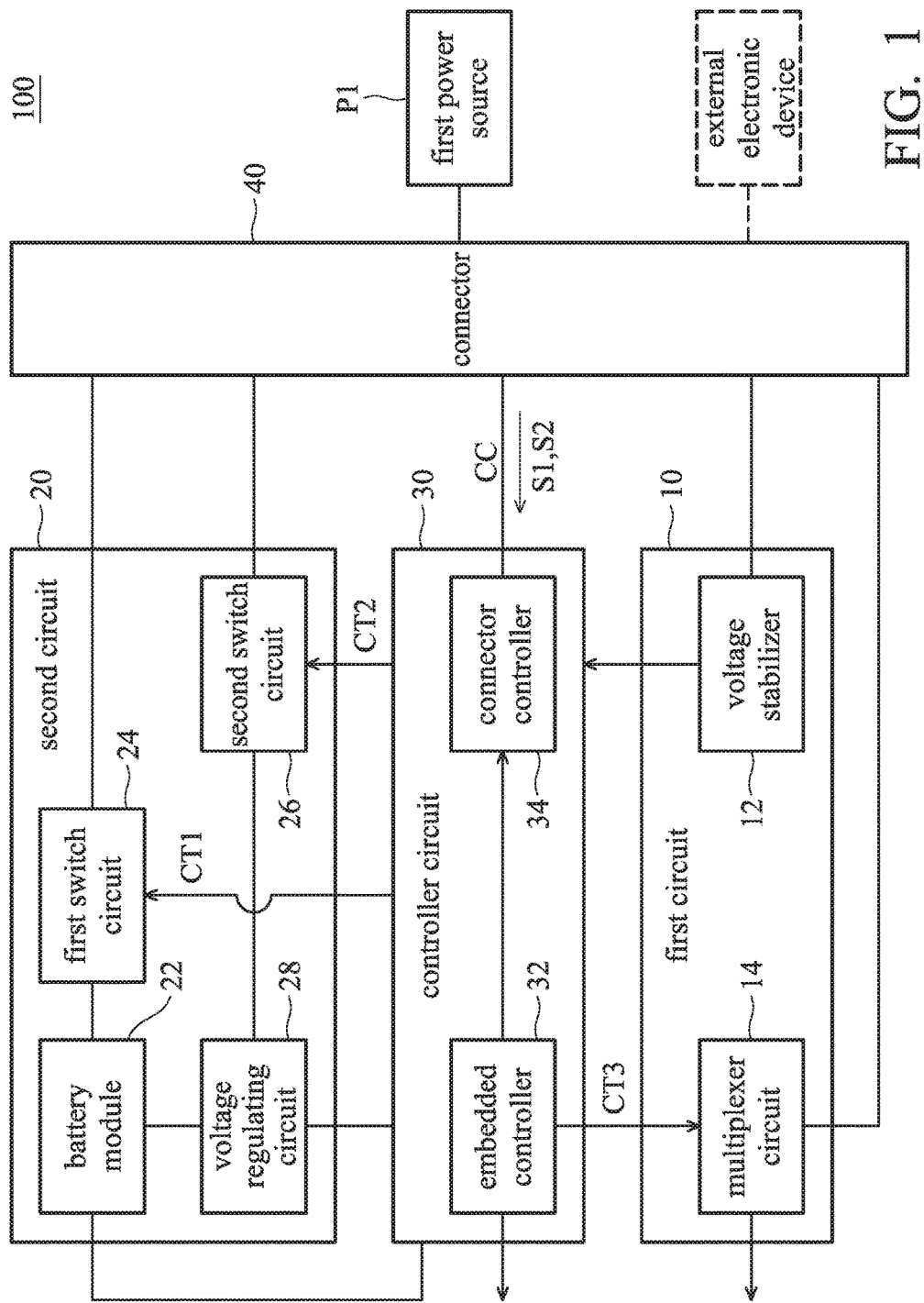
FIG. 1 is a block diagram of an electronic device according to an embodiment of the present invention.

Please refer to FIG. 1. FIG. 1 is a block diagram of an electronic device 100 according to an embodiment of the present invention. The electronic device 100 can be any desktop computer or any portable electronic device, including but not limited to a handheld computer, a tablet computer, a mobile phone, a mobile Internet device (MID), a personal digital assistant (PDA), electronics at the point-of-sale (EPOS or POS), or the like, including a combination of two or more of these items. However, it should be appreciated that the portable electronic device is only one example of a portable electronic device, and the present invention is not limited to the electronic device mentioned above.

The electronic device 100 can include a first circuit 10, a second circuit 20, a controller circuit 30 and a connector 40. The first circuit 10 can include a voltage stabilizer 12 and a multiplexer circuit 14. The second circuit 20 can include a battery module 22, a first switch circuit 24, a second switch circuit 26 and voltage regulating circuit 28. The first switch circuit 24 is coupled between the battery module 22 and the connector 40. The second switch circuit 26 is coupled between the voltage regulating circuit 28 and the connector 40. The battery module 22 is coupled to the voltage regulating circuit 28 to provide the voltage regulating circuit 28 with the DC voltage, such as 12 volts. Then, the voltage regulating circuit 28 converts the DC voltage into several voltages, such as 5 volts, 3.3 volts and so on, for powering every electronic parts of the electronic device 100, and then transmits those voltages to the respective electronic part. The voltage stabilizer 12 and the multiplexer circuit 14 are coupled to the connector 40. The voltage stabilizer 12 is configured to receive power and to convert the power into a stable voltage for powering the controller circuit 30. A processor, not shown in the figures, of the electronic device 100 can transmit data to an external electronic device by the multiplexer circuit 14 and the connector 40.

The controller circuit 30 is coupled to the voltage stabilizer 12, the multiplexer circuit 14, the first switch circuit 24, the second switch circuit 26, the battery module 22, the voltage regulating circuit 28 and the connector 40. The controller circuit 30 includes an embedded controller 32 and a connector controller 34. The embedded controller 32 and the connector controller 34 are integrated in the same integrated circuit chip. The controller circuit 30 can monitor electricity information of the battery module 22. The electricity information can include a value of the voltage output by the battery module 22. The connector 40 is a universal serial bus TYPE C connector.

A configuration channel CC is implemented between the controller circuit 30 and the connector 40. The controller circuit 30 can determine a type of a device to which the electronic device 100 connects via the configuration channel CC. For example, the device can be an external computer, a computer monitor, or a smart phone. In this embodiment, the electronic device 100 only has a slot. That is, the electronic device 100 has the connector 40 with single jack. When the controller circuit 30 monitors and finds that the voltage value of the battery module 22 is lower than a first threshold voltage (such as being lower than 3 volts, which is not able to supply the controller circuit 30 with enough voltage to work properly) and the user connects the connector 40 with a first power source P1 (such as a charger), the first power source P1 can provide the voltage stabilizer 12 with electricity, so that the voltage stabilizer 12 converts the first power source P1 into an activating voltage (such as 3.3 volts) for the controller circuit 30, so as to enable the controller circuit 30. When the connector 40 is connected to the first power source P1, the connector 40 sends a first detection signal S1 to the controller circuit 30 through the configuration channel CC. Therefore, the controller circuit 30 determines that the connector 40 is connected to a power source, such as first power source P1, according to the first detection signal S1, and then the controller circuit 30 sends a first control signal CT1 to turn on the first switch circuit 24, so that the first power source P1 charges the battery module 22 through the first switch circuit 24.

When the user only connects the connector 40 to an external electronic device (such as a smart phone or a tablet computer), the connector 40 sends a second detection signal S2 to the controller circuit 30 through the configuration channel CC. The controller circuit 30 determines that the connector 40 is connected to an external electronic device according to the second detection signal S2. When the controller circuit 30 monitors and finds that the voltage value is higher than a second threshold voltage (such as being higher than 9 volts), the controller circuit 30 sends a second control signal CT2 to turn on the second switch circuit 26, so that the battery module 22 charges the external electronic device through the voltage regulating circuit 28 and the second switch circuit 26. The second threshold voltage is not limited to 9 volts. For example, the second threshold voltage can be set to 5 volts.

Furthermore, the controller circuit 30 can include an identification database, wherein the identification database includes a plurality of identification data, and each of identification data can include a brand, a device type or a device number of an external electronic device. When the user connects the connector 40 to an external electronic device (such as a flash drive or a external display), the controller circuit 30 receives device identification data for the external electronic device through the configuration channel CC, for example it receives the brand and device type of the external electronic device, so as to determine whether the device identification data conforms to one of the identification data stored in the controller circuit 30. For example, when the identification data includes the brand of the external electronic device, the device identification data, including the brand, of the external electronic device conforms to one of the identification data. Thus, the controller circuit 30 sends a third control signal CT3 to the multiplexer circuit 14, so that the external electronic device is able to transmit data to a core circuit (not shown in the figures) of the electronic device 100 through the multiplexer circuit 14. When the device identification data does not conform to one of the identification data, such as the brand of the external electronic device not conforming to brands stored in the controller circuit 30, the controller circuit 30 sends the third control signal CT3 to the multiplexer circuit 14, so that the external electronic device is not able to transmit data to the electronic device 100 through the connector 40 and the multiplexer circuit 14.

Figure 2:
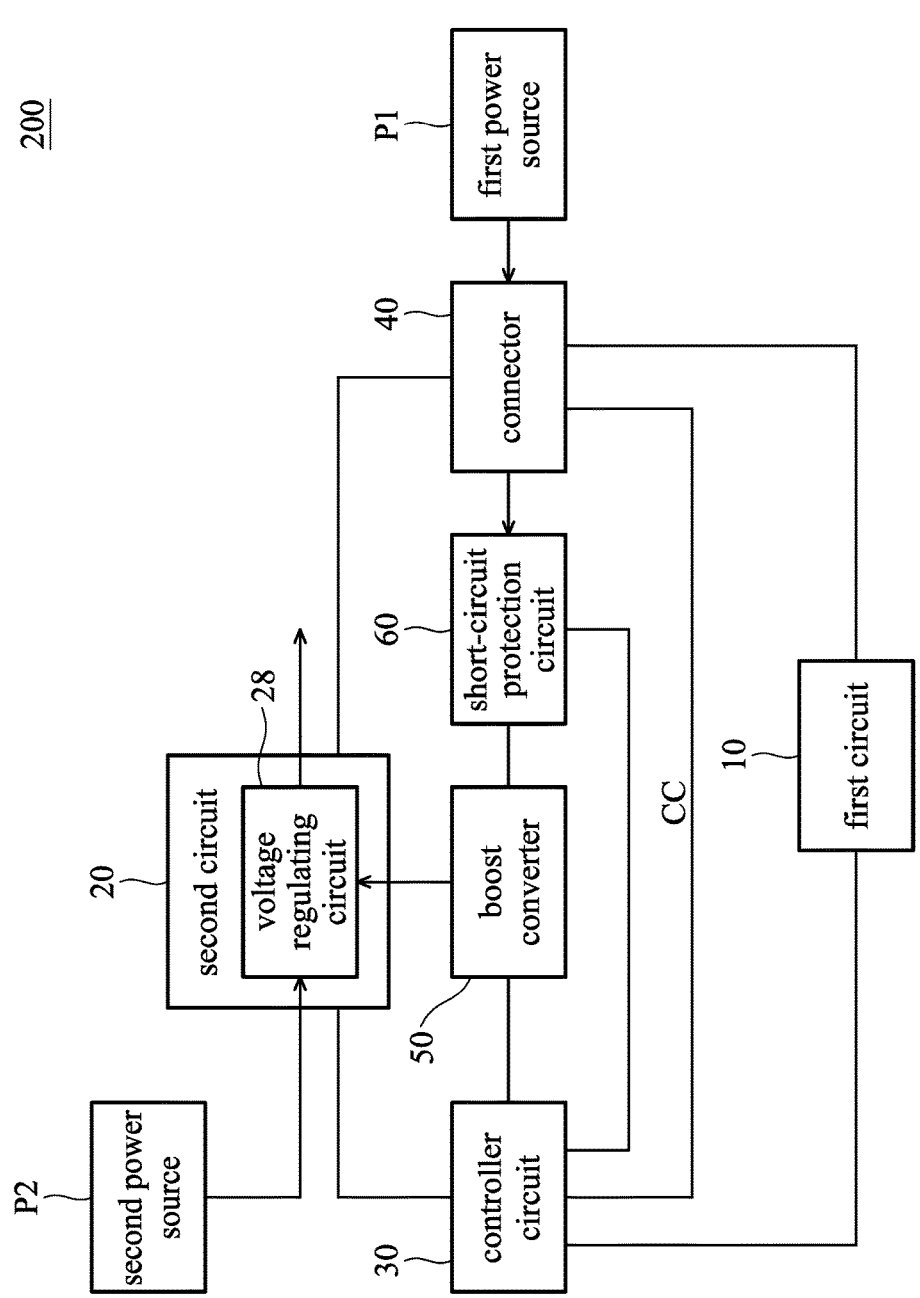
FIG. 2 is a block diagram of an electronic device according to another embodiment of the present invention.

Please refer to FIG. 2, which is a block diagram of an electronic device 200 according to another embodiment of the present invention. In this embodiment, the electronic device 200 can be a notebook computer and can include two jacks. One of the jacks is the connector 40 for connecting with the first power source P1, and the other jack is a power jack (not shown in the figures) for connecting to a second power source P2. In some embodiments, an AC to DC converter (not shown in the figures) can be used to convert the commercial power into DC power to serve as the second power source P2 for powering the voltage regulating circuit 28. In addition, in contrast to the electronic device 100, the electronic device 200 can further include a boost converter 50 coupled to the connector 40, the controller circuit 30, and the voltage regulating circuit 28.

When the user wants to run some low-load application of the electronic device 200, the user can only connect the electronic device 200 to the second power source P2. In this situation, the second power source P2 can provide the voltage regulating circuit 28 with 19 volts. However, when the user wants to perform some high-load applications (such as 3D games), power provided by the second power source P2 cannot satisfy the power requirements of the electronic device 200. For example, the second power source P2 only provides the electronic device 200 with 65 watts, but the electronic device 200 needs 85 watts when running a 3D game. Therefore, the user can connect the connector 40 to the first power source P1. At this time, the controller circuit 30 can detect that the connector 40 is connected to the first power source P1 by the configuration channel CC. After that, the controller circuit 30 controls the boost converter 50 to convert the first power source P1 into a supply power, such as boosting 5 volts to 19 volts, so that the supply power and the second power source P2 cooperatively provide the voltage regulating circuit 28 with electricity. As a result, it can solve the problem wherein the electronic device 200 needs more power to run the high-load application. In addition, the user can connect the connector 40 to a display as well, and can retrieve driving power from the display to serve as the first power source P1.

Moreover, the electronic device 200 can include a short-circuit protection circuit 60 which is disposed between the connector 40 and the boost converter 50, and the short-circuit protection circuit 60 is coupled to the controller circuit 30, the connector 40 and the boost converter 50. When the controller circuit 30 detects that the connector 40 is not connected to any external electronic device, the controller circuit 30 turns off the short-circuit protection circuit 60, so as to prevent the boost converter 50 and other electronic parts in the electronic device 200 from being damaged due to an accidental short circuit on the connector 40.

Figure 3A:
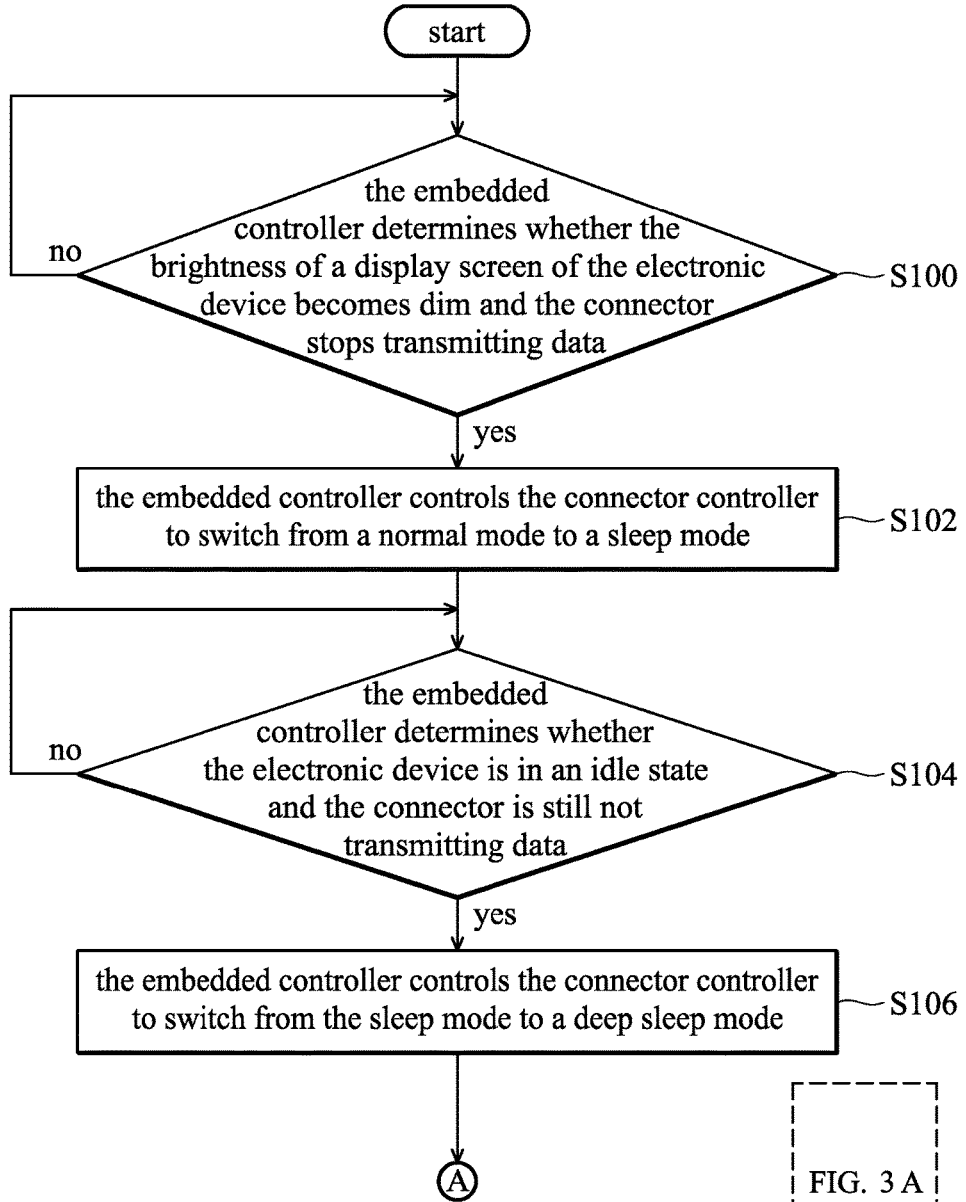
FIG. 3A and FIG. 3B are a flow chart of an embedded controller controlling a driving current of a connector controller according to an embodiment of the present invention.
Figure 3B:
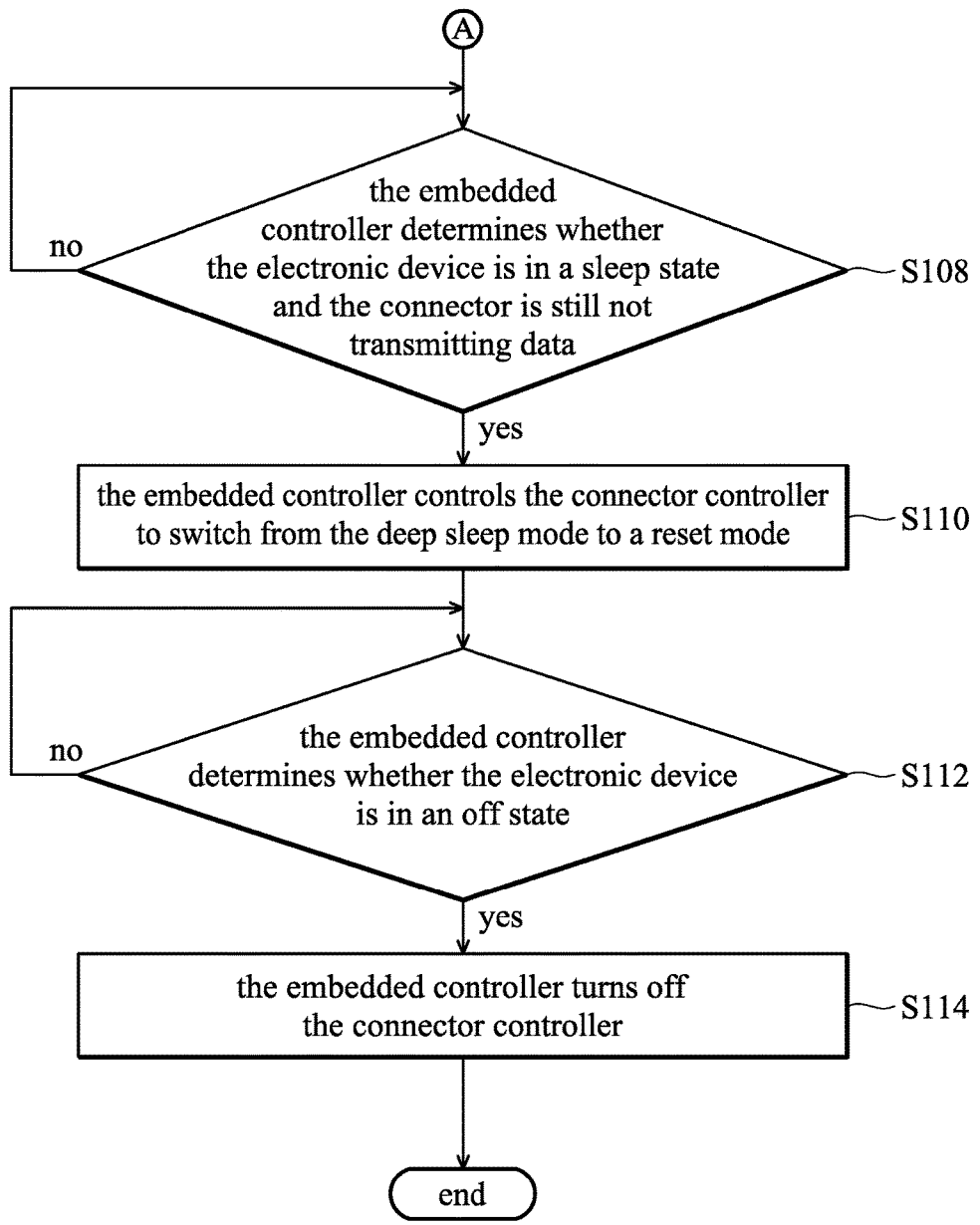

Please refer to FIG. 3A and FIG. 3B, which are a flow chart of the embedded controller 32 controlling a driving current of the connector controller 34 according to an embodiment of the present invention. In step S100, the embedded controller 32 detects and determines whether the brightness of a display screen (not shown in the figures) of the electronic device 100 becomes dim and detects whether the connector 40 has stopped transmitting data. If the brightness of the display screen of the electronic device 100 becomes dim and the connector 40 stops transmitting data, step S102 is performed. If the brightness of the display screen of the electronic device 100 does not become dim and the connector 40 still transmits data, step S100 is performed again. In step S102, when the embedded controller 32 determines that the brightness of the display screen of the electronic device 100 has become dim and the connector 40 has stopped transmitting data, the embedded controller 32 controls the connector controller 34 to switch from a normal mode to a sleep mode. At this time, the embedded controller 32 decreases the driving current of the connector controller 34, such as decreasing the driving current to be 2 mA.

In step S104, the embedded controller 32 detects and determines whether the electronic device 100 is in an idle state and detects whether the connector 40 is still not transmitting data. If the electronic device 100 is in the idle state and the connector 40 is still not transmitting data, step S106 is performed. If the electronic device 100 is not in the idle state and the connector 40 still transmits data, step S104 is performed again. In step S106, when the embedded controller 32 determines that the electronic device 100 has entered the idle state and the connector 40 has stopped transmitting data, the embedded controller 32 controls the connector controller 34 to switch from the sleep mode to a deep sleep mode. At this time, the embedded controller 32 can decrease the driving current of the connector controller 34, such as decreasing the driving current to be 2.5 µA.

In step S108, the embedded controller 32 detects and determines whether the electronic device 100 is in a sleep state and detects whether the connector 40 is still not transmitting data. If the electronic device 100 is in the sleep state and the connector 40 is still not transmitting data, step S110 is performed. If the electronic device 100 is not in the sleep state and the connector 40 is still transmitting data, step S108 is performed again. In step S110, when the embedded controller 32 determines that the electronic device 100 has entered the sleep state and the connector 40 is still not transmitting data, the embedded controller 32 controls the connector controller 34 to switch from the deep sleep mode to a reset mode. At this time, the embedded controller 32 can decrease the driving current of the connector controller 34, such as decreasing the driving current to be 1 µA.

In step S112, the embedded controller 32 detects and determines whether the electronic device 100 is in an off state. If the electronic device 100 is in the off state, step S114 is performed. If the electronic device 100 is not in the off state, step S112 is performed again. In step S114, when the embedded controller 32 determines that the electronic device 100 has entered the off state, the embedded controller 32 turns off the connector controller 34. At this time, the driving current of the connector controller 34 is 0 A.

In contrast to the prior art, the present invention provides an electronic device, which includes a controller circuit 30 and a connector 40. The connector 40 can be a universal serial bus TYPE C connector, so as to allow the user to plug an external cable into the connector 40 without alignment. A configuration channel CC is implemented between the controller circuit 30 and the connector 40. The controller circuit 30 can receive a detection signal through the configuration channel CC, so as to determine a type of a device to which the connector 40 connects. When the connector 40 is connected to an external power, the controller circuit 30 can turn on the first switch circuit 24, so that the external power charges the battery module 22. In addition, when the electronic device performs a high-load application, the user can connect a first power source to the connector 40 and can connect a second power source to a power jack at the same time, so that the first power source and the second power source provide the electronic device with electricity at the same time for satisfying the power requirements of the electronic device. Furthermore, the controller circuit 30 is an integrated chip, and includes the embedded controller 32 and the connector controller 34. The embedded controller 32 can control a driving current of the connector controller 34 according to a system state of the electronic device, so as to save power.

It should be understood that the elements and features recited in the appended claims may be combined in different ways to produce new claims that likewise fall within the scope of the invention. Thus, whereas the dependent claims appended below depend from only a single independent or dependent claim, it should be understood that these dependent claims may, alternatively, be made to depend in the alternative from any preceding or following claim, and that such new combinations are to be understood as forming a part of the specification of the invention.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
   a battery module;
   a first switch circuit, coupled to the battery module;
   a connector, coupled to the first switch circuit;
   a voltage stabilizer, coupled to the connector;
   a controller circuit, coupled to the voltage stabilizer, the connector, the first switch circuit and the battery module, and a configuration channel being implemented between the controller circuit and the connector;
   a voltage regulating circuit, coupled to the battery module and the controller circuit; and
   a second switch circuit, coupled to the voltage regulating circuit, the connector and the controller circuit;
   wherein when a voltage of the battery module is lower than a threshold voltage and the connector is only connected to a first power source, the first power source provides an activating voltage to the controller circuit through the voltage stabilizer, so as to enable the controller circuit, the connector sends a first detection signal to the controller circuit through the configuration channel, and the controller circuit sends a first control signal to turn on the first switch circuit according to the first detection signal, so that the first power source charges the battery module through the first switch circuit,
   wherein when the connector only connects to an external electronic device and the connector sends a second detection signal to the controller circuit, the controller circuit sends a second control signal to turn on the second switch circuit according to the second detection signal so that the battery module charges the external electronic device through the voltage regulating circuit and the second switch circuit, wherein the controller circuit comprises an embedded controller and a connector controller, the embedded controller is configured to detect a system state of the electronic device, and the embedded controller controls an operating mode of the connector controller according to the system state.

2. The electronic device as claimed in claim 1, wherein the controller circuit is coupled to the battery module so as to monitor electricity information of the battery module.

3. An electronic device, comprising:
   a battery module;
   a first switch circuit, coupled to the battery module;
   a connector, coupled to the first switch circuit;
   a voltage stabilizer, coupled to the connector;
   a controller circuit, coupled to the voltage stabilizer, the connector, the first switch circuit and the battery module, and a configuration channel being implemented between the controller circuit and the connector;
   a voltage regulating circuit;
   a second power source, for powering the voltage regulating circuit; and
   a boost converter, coupled to the connector and the voltage regulating circuit;
   wherein when a voltage of the battery module is lower than a threshold voltage and the connector is only connected to a first power source, the first power source provides an activating voltage to the controller circuit through the voltage stabilizer, so as to enable the controller circuit, the connector sends a first detection signal to the controller circuit through the configuration channel, and the controller circuit sends a first control signal to turn on the first switch circuit according to the first detection signal, so that the first power source charges the battery module through the first switch circuit;
   wherein when the connector is connected to the first power source outside of the electronic device, the boost converter transforms the first power source to a supply power, so that the supply power and the second power source cooperatively power the voltage regulating circuit, wherein the controller circuit comprises an embedded controller and a connector controller, the embedded controller is configured to detect a system state of the electronic device, and the embedded controller controls an operating mode of the connector controller according to the system state.

4. The electronic device as claimed in claim 3, further comprising a short-circuit protection circuit coupled between the connector and the boost converter.

5. An electronic device, comprising:
   a battery module;
   a first switch circuit, coupled to the battery module;
   a connector, coupled to the first switch circuit;
   a voltage stabilizer, coupled to the connector;
   a controller circuit, coupled to the voltage stabilizer, the connector, the first switch circuit and the battery module, and a configuration channel being implemented between the controller circuit and the connector; and
   a multiplexer circuit, coupled to the connector and the controller circuit;
   wherein when a voltage of the battery module is lower than a threshold voltage and the connector is only connected to a first power source, the first power source provides an activating voltage to the controller circuit through the voltage stabilizer, so as to enable the controller circuit, the connector sends a first detection signal to the controller circuit through the configuration channel, and the controller circuit sends a first control signal to turn on the first switch circuit according to the first detection signal, so that the first power source charges the battery module through the first switch circuit;
   wherein the controller circuit comprises an identification database, the identification database comprises a plurality of identification data, and when the connector is connected to an external electronic device, the controller circuit receives a device identification data of the external electronic device, so as to determine whether the device identification data conforms to one of the identification data;
   wherein when the device identification data does not conform to one of the identification data, the controller circuit sends a third control signal to the multiplexer circuit, so that the external electronic device is not able to transmit data to the electronic device through the multiplexer circuit, wherein the controller circuit comprises an embedded controller and a connector controller, the embedded controller is configured to detect a system state of the electronic device, and the embedded controller controls an operating mode of the connector controller according to the system state.

6. The electronic device as claimed in claim 5, wherein when the device identification data conforms to one of the identification data, the controller circuit sends the third control signal to the multiplexer circuit, so that the external electronic device is able to transmit data to the electronic device through the multiplexer circuit.

* * * * *